United States Patent
Masaki et al.

(10) Patent No.: US 6,809,285 B2
(45) Date of Patent: Oct. 26, 2004

(54) MICRO ELECTRO DISCHARGE MACHINING METHOD AND APPARATUS

(75) Inventors: Takeshi Masaki, Hirakata (JP); Toshihiko Wada, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/075,376

(22) Filed: Feb. 15, 2002

(65) Prior Publication Data

US 2002/0113042 A1 Aug. 22, 2002

(30) Foreign Application Priority Data

Feb. 22, 2001 (JP) ........................................ 2001-045982

(51) Int. Cl.⁷ .......................... B23H 1/00; B23H 1/04; B23H 7/30
(52) U.S. Cl. ................. 219/69.17; 219/69.15; 219/69.16; 219/69.2
(58) Field of Search ........................ 219/69.15, 69.16, 219/69.17, 69.2

(56) References Cited

U.S. PATENT DOCUMENTS 5,676,860 A * 10/1997 Muro et al. ............... 219/69.2
6,448,529 B1 * 9/2002 Hiraishi et al. ........... 219/69.16

FOREIGN PATENT DOCUMENTS

| FR | 2518442 A | * | 6/1983 | ............. B23P/1/08 |
| JP | 59-192425 A | * | 10/1984 | .............. 219/69.16 |
| JP | 61-197125 A | * | 9/1986 | |

OTHER PUBLICATIONS

Takeshi Masaki, "Micro Electro Discharge Machining Technologies", National Technical Report, vol. 39, No. 5, Oct. 1993.

* cited by examiner

*Primary Examiner*—Geoffrey S. Evans
(74) *Attorney, Agent, or Firm*—Greenblum & Bernstein, P.L.C.

(57) ABSTRACT

In a micro electro discharge machining method and apparatus, the shapes of minute holes are transferred to a tool electrode through a plate electrode serving as an intermediate electrode, and a workpiece is machined using the tool electrode. As a result, the time for machining is reduced. During the electro discharge machining process, the relative distance between the tool electrode and the plate electrode or the workpiece is changed at a prescribed frequency and discharge pulse output is controlled in synchronization with the change in the relative distance between the tool electrode and the plate electrode or the workpiece, so that high precision machining is enabled.

5 Claims, 3 Drawing Sheets

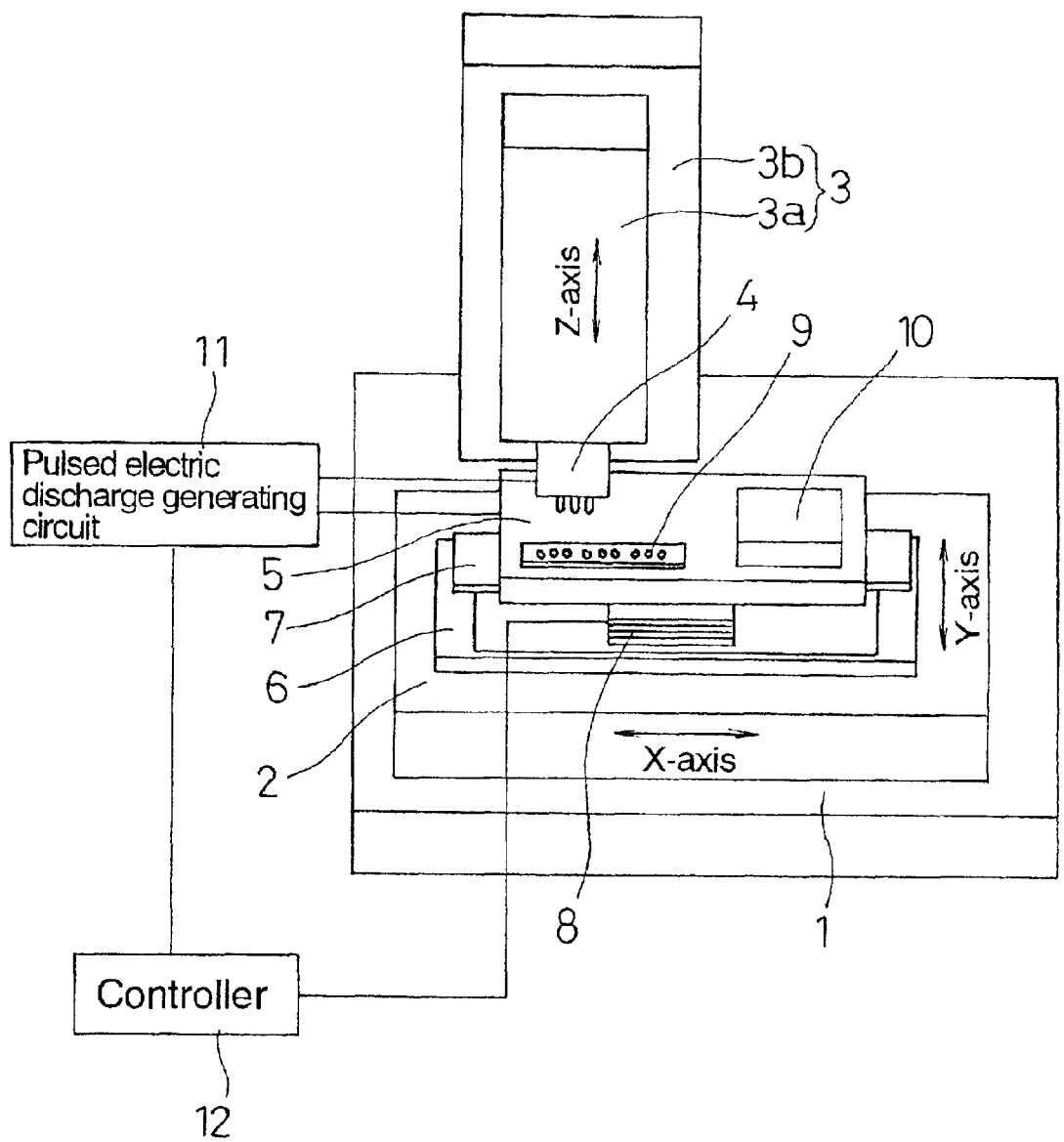

MICRO ELECTRO DISCHARGE MACHINING METHOD AND APPARATUS

The present disclosure relates to subject matter contained in priority Japanese Patent Application No. 2001-45982, filed on Feb. 22, 2001, the contents of which is herein expressly incorporated by reference in its entirety.

BACKGROUND OF THE INVENTION

1. Field of the Invention

The present invention relates to a micro electro discharge machining method and apparatus. The invention more particularly relates to a micro electro discharge machining method and apparatus used in machining parts to be provided with a large number of minute holes having a highly precise shape and a diameter, for example, as small as 100 μm or less such as an ink jet printer nozzle and a suction nozzle for minute parts.

2. Description of Related Art

Minute hole machining includes various methods such as etching by photolithography, laser machining, and electroforming. Among the methods, micro electro discharge machining is suitable for high precision minute hole machining. According to the method, a highly precisely shaped, micro tool electrode is rotated and holes are formed on a one-hole basis by discharge. (Reference: "Micro Electro Discharge Machining Technologies", National Technical Report, Vol. 39, No. 5, Oct. 1993, pp. 33 to 39).

In the micro electro discharge machining, when a group of a large number of identical size minute holes are formed, the relative position of the tool electrode and a work piece is determined by NC, and holes are sequentially machined on a one-hole basis. When groups of holes having different sizes are formed, tool electrodes corresponding to the hole diameters are prepared and switched during machining.

The described conventional method however suffers from large errors in the size and shape of holes when a large number of minute holes are produced. For example, errors in the process of machining each hole, errors associated with consumption of an electrode in the sequential machining process and errors resulting from the necessity of re-shaping the electrode for its consumption amount to the large errors. In addition, the time for machining increases in proportion to the number of holes to be machined, which impedes improvement in the productivity.

SUMMARY OF THE INVENTION

The present invention is directed to a solution to the above disadvantages associated with the conventional method. It is an object of the present invention to provide a micro electro discharge machining method and apparatus which improves the hole size precision at the time of producing a large number of minute holes and shortens the total machining time to improve the productivity.

In a micro electro discharge machining method according to the invention, the relative distance between a tool electrode and a workpiece is changed at a frequency and in an amplitude as desired. Discharge pulse output is controlled in synchronization with the change in the relative distance between the tool electrode and the workpiece to perform electro discharge machining between them.

Electric discharges are caused between a tool electrode and a plate electrode provided with a plurality of holes and the pattern of the plate electrode is transferred to the tool electrode. Electric discharges are then caused between a workpiece and the tool electrode having the transferred pattern. During the electro discharge machining, the relative distance between the tool electrode and the plate electrode or the workpiece is changed at a frequency and in an amplitude as desired, and discharge pulse output is controlled in synchronization with the change in the relative distance between the tool electrode and the plate electrode or the workpiece.

Multiple hole groups each including a plurality of holes are provided in a thin plate electrode. A tool electrode is machined sequentially using the multiple hole groups in the plate electrode, so that the transfer accuracy is increased by the use of the thin plate electrode, and a tool electrode having a necessary length for the machining is produced.

A micro electro discharge machining apparatus according to the present invention includes a tool electrode, a circuit for generating pulsed electric discharge between the tool electrode and a workpiece, a device for positioning the workpiece in an XY-plane, a device for positioning the tool electrode in the Z-direction orthogonal to the XY-plane, a vibration member for changing the relative distance between the tool electrode and the workpiece at a frequency and in an amplitude as desired, and a device for controlling a discharge pulse in synchronization with the change in the relative distance between the tool electrode and the workpiece.

A plate electrode provided with a plurality of holes may be used to produce a tool electrode.

When a plate electrode provided with multiple hole groups each including a plurality of holes is used to produce a tool electrode, the transfer accuracy is more improved.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 1 is a schematic view of a micro electro discharge machining apparatus according to one embodiment of the present invention;

DETAILED DESCRIPTION OF THE PREFERRED EMBODIMENTS

Figure 2A:
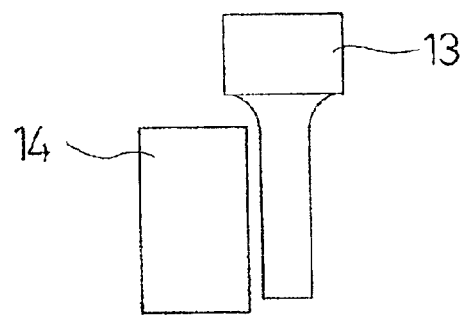
FIGS. 2A to 2C are views for use in illustration of the process of machining a tool electrode according to the embodiment.

A micro electro discharge machining method and apparatus according to an embodiment of the present invention will be now described in conjunction with FIGS. 1 to 3C.

In FIG. 1, reference numeral 1 denotes a main body base. An XY-table 2 places a workpiece in an arbitrary position in the horizontal XY-plane. A Z-axis mechanism 3 positions a mobile portion 3a in the Z-axis direction along a column guide 3b vertical to the XY-plane. A tool electrode 4 is attached to the mobile portion 3a of the Z-axis mechanism 3.

A vibration stage 5 is attached at the middle part of a plate spring 7 having both ends secured to an attachment frame 6 fixed on the XY-table 2. The vibration stage 5 can move in a prescribed range only in the Z-axis direction. The vibration stage 5 is actuated by an actuator 8 provided in the attachment frame 6 and vibrated at a frequency and in an amplitude as desired. A plate electrode 9 is provided on the vibration stage 5 and a workpiece 10 is also provided on the vibration stage 5.

There are a pulsed electric discharge generating circuit 11 and a controller 12 which controls the pulsed electric discharge generating circuit 11 and the actuator 8.

Figure 2B:
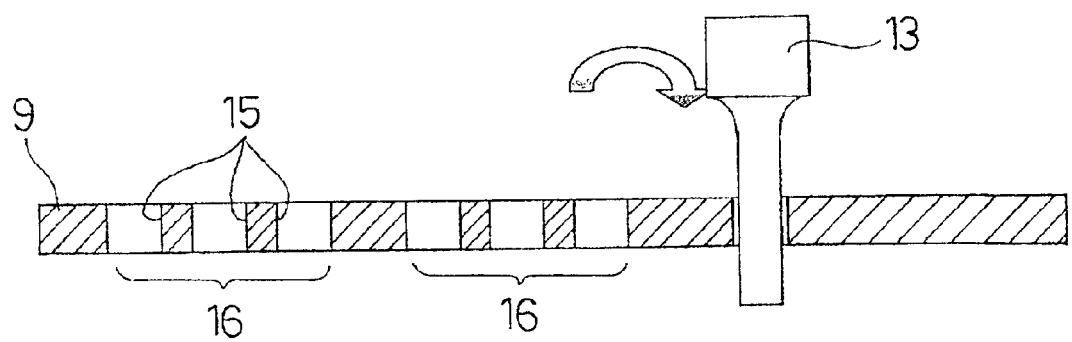
Figure 2C:
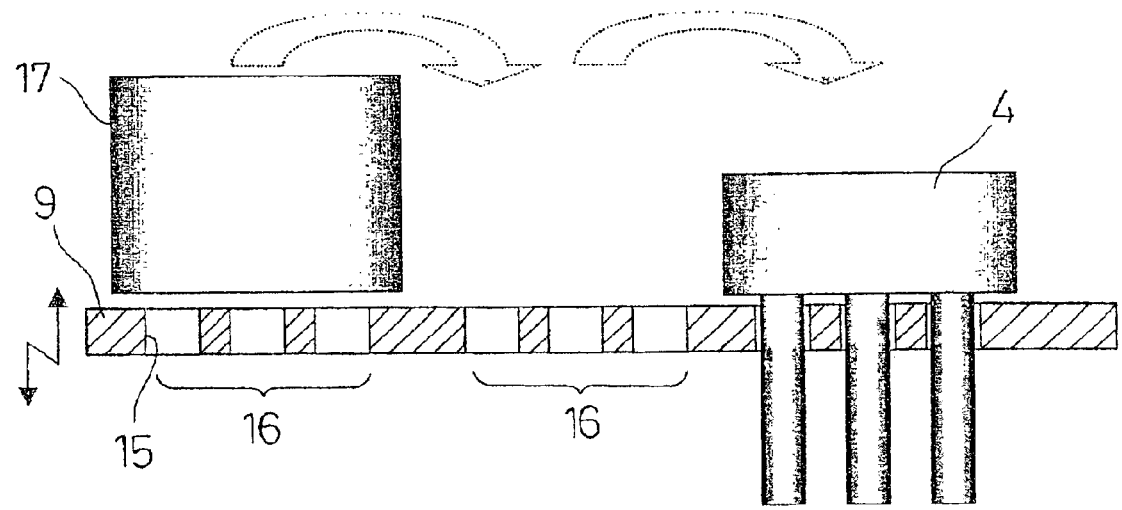

Referring to FIGS. 2A to 2C, a method of machining minute holes will be described. As shown in FIG. 2A, a block electrode 14 is used to form a cylindrical electrode 13 having a desired diameter to provide holes in the plate electrode 9 by machining. During the machining, the block electrode 14 is provided on the vibration stage 5 on the XY-table 2, and the cylindrical electrode 13 is attached to the Z-axis mechanism 3 storing a rotary driving mechanism. While the vibration stage 5 is not operated, the cylindrical electrode 13 is rotated by the rotary mechanism, and discharges in the reversed polarity are caused between the electrode 13 and the block electrode 14.

Then, as shown in FIG. 2B, the plate electrode 9 is provided on the vibration stage 5 on the XY-table 2, and using the cylindrical electrode 13, the plate electrode 9 is provided with holes 15 such as round holes and slits or a group 16 of a combination of holes 15. During the machining of the plate electrode 9, the cylindrical electrode 13 itself is rotated so that the micro electro discharge machining is stably performed. According to the embodiment, multiple hole groups 16 each including a plurality of holes 15 are arranged and formed.

As shown in FIG. 2C, using the plate electrode 9 having the pattern of the hole groups 16, electro discharge machining is performed to a new block electrode 17 attached to the Z-axis mechanism 3 to transfer the pattern. As a result, a tool electrode 4 is produced. The resulting tool electrode 4 has a length determined based on how much the electrode 17 is deeply fed.

In this case, the thinner the plate electrode 9 is, the higher the shape transfer accuracy could be. Accordingly, when the tool electrode 4 should be long, the plate electrode 9 which is thin and has multiple hole groups 16 is employed, and as shown by the arrow in FIG. 2C, the hole groups 16 are sequentially used to transfer the pattern.

Then, using the tool electrode 4 formed in the above process, the workpiece 10 provided on the vibration stage 5 on the XY-table 2 is subjected to electro discharge machining. Thus, a large number of patterns are uniformly transferred to the workpiece 10 by the machining.

During the electro discharge machining described above, when the plate electrode 9 is machined using the cylindrical electrode 13, the cylindrical electrode 13 itself is rotated, so that the micro electro discharge machining is stably performed. When the block electrode 17 is machined using the plate electrode 9, and when the workpiece 10 is machined using the tool electrode 4, the electrodes cannot be rotated, and the opposing area increases. This could impede stable micro electro discharge machining and high precision machining accordingly. Therefore, according to the embodiment, the plate electrode 9 or the work piece 10 is finely vibrated in the Z-axis direction. The plate spring 7 and the actuator 8 are designed so that the vibration amplitude is adjusted about in the range from 1 to 10 times as large as the discharge gap. The discharge gap is determined based on the discharge conditions. Since a relatively large mass is finely vibrated in large strokes, the vibration frequency is limited to about several 100 Hz.

An electrically insulating liquid is used for the working fluid during the above electro discharge machining, while ultrapure water is used in some cases of high speed machining. In the machining using ultrapure water, the electrical insulation degree of the working fluid instantaneously goes through great changes, which affects the machining precision. As a result, when voltage is applied between both electrodes while there is a large gap between the electrodes by fine vibration, very small electrolytic current is passed. This could cause insufficient charging for discharge, or abnormal elution of the workpiece by the electrolytic effect could degrade the machining precision.

Figure 3A:
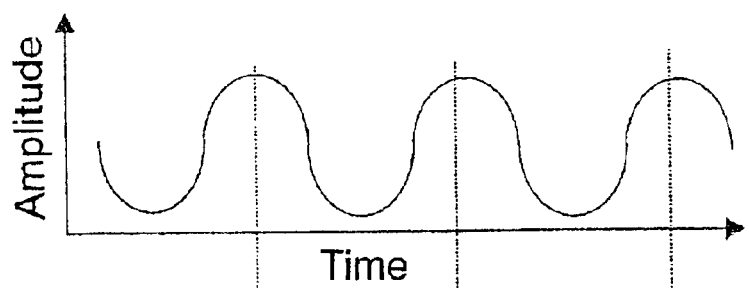
FIGS. 3A to 3C are timing charts for use in illustration of vibration by a vibration stage, the output voltage of a pulsed electric discharge generating circuit and discharge current.
Figure 3B:
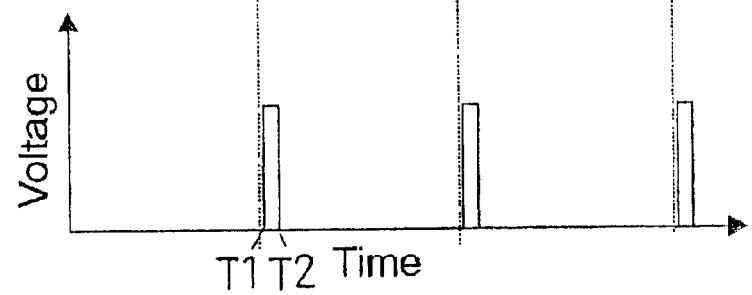
Figure 3C:

Therefore, according to the embodiment, as shown in FIGS. 3A to 3C, the controller 12 controls the pulsed electric discharge generating circuit 11 and the actuator 8 in synchronization so that voltage is applied only the moment that the distance between the electrodes is near enough to perform discharge. FIG. 3A shows a vibration waveform by the vibration stage 5, FIG. 3B shows the waveform of a pulse voltage output from the pulsed electric discharge generating circuit 11, and FIG. 3C shows a timing for discharges caused by them. Note that as shown in FIGS. 3A to 3C, voltage turns on slightly delayed from the uppermost point (the closest position) in the fine vibration by the vibration stage 5, and the delay and the on-time interval of the voltage is controlled as desired using the controller 12.

The pulse voltage can be applied for ten microseconds or less in order to avoid electrolytic effect. Meanwhile, the current for the discharge pulse in the micro electric discharge is generally on the order of several ten nanoseconds, and therefore as shown in FIG. 3C, there are a number of successive discharges during the time width.

According to the embodiment, not only in the machining using ultrapure water, but also in the machining using oil which reduces the gap to an even smaller size, the arc state is effectively avoided, so that the machining precision is improved, and a high aspect form results from the machining.

As described, by the micro electro discharge machining method and apparatus according to the present invention, the relative distance between the tool electrode and the workpiece is changed at a frequency and in an amplitude as desired. Thereby, high precision discharge machining is achieved without rotating the tool electrode. As a result, a plurality of holes or holes in a desired pattern is machined at a time using any suitable tool electrodes, which contributes to improvement in the productivity. Cumulative errors are reduced as well. In addition, the discharge pulse output is controlled in synchronization with change in the relative distance between the tool electrode and the workpiece. Thereby, electrolytic current which could cause insufficient charging for discharge is avoided, and the workpiece is prevented from being abnormally eluted, so that high machining precision results.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A micro electro discharge machining method comprising producing a tool electrode with a pattern of a plate electrode by electro discharge machining the tool electrode with the plate electrode, the plate electrode being provided with a plurality of holes in the pattern; and performing electro discharge machining on a workpiece with the tool electrode.

2. The micro electro discharge machining method according to claim 1, further comprising providing multiple hole groups in the plate electrode, each hole group including a plurality of holes, and producing the tool electrode by sequentially electro discharge machining using the multiple hole groups in the plate electrode.

3. A micro electro discharge machining apparatus, comprising:

tool electrode;

a circuit that generates pulsed electric discharge between the tool electrode and a workpiece;

a first device that positions the workpiece in a XY-plane;

a second device that positions the tool electrode in a Z-direction orthogonal to the XY-plane;

a vibration member that changes a relative distance between the tool electrode and the workpiece at a predetermined frequency and with a predetermined amplitude; and a controller that controls a discharge pulse in synchronization with the charge in the relative distance between the tool electrode and the workpiece such that the discharge pulse is output when the relative distance between the tool electrode and the workpiece becomes sufficiently small such that discharge is performed; and a plate electrode provided with a plurality of holes configured to produced the tool electrode;

wherein the plate electrode is positioned in the XY-plane by the first device;

the circuit generates pulsed electric discharge between the tool electrode and the plate electrode; and the controller controls a discharge pulse in synchronization with the change in a relative distance between the tool electrode and the plate electrode.

4. The micro electro discharge machining apparatus according to claim 3, wherein the plate electrode is provided with multiple hole groups each including a plurality of holes.

5. A micro electro discharge machining method, comprising:

producing a tool electrode with a pattern of a plate electrode by electro discharge machining with the plate electrode, the plate electrode being provided with a plurality of holes in the pattern;

changing, during the electro discharge machining process, a relative distance between the tool electrode and the plate electrode at a predetermined frequency and with a predetermined amplitude;

outputting a discharge pulse in synchronization with the change in the relative distance between the tool electrode and the plate electrode;

changing a relative distance between the tool electrode and a workpiece at a predetermined frequency and with a predetermined amplitude;

controlling a discharge pulse output in synchronization with the change in the relative distance between the tool electrode and the workpiece such that the discharge pulse output is generated when the relative distance between the tool electrode and the workpiece becomes sufficiently small such that discharge is performed; and performing electro discharge machining between the tool electrode and the workpiece.

* * * * *